(12) United States Patent
Vacca Cavalotto et al.

(10) Patent No.: US 9,948,183 B2
(45) Date of Patent: Apr. 17, 2018

(54) CURRENT THRESHOLD DETECTION IN SYNCHRONOUS REGULATION

(71) Applicant: Infineon Technologies AG, Neubiberg (DE)

(72) Inventors: Daniele Vacca Cavalotto, Valperga (IT); Enrico Orietti, Pozzonovo (IT)

(73) Assignee: Infineon Technologies AG, Neubiberg (DE)

( * ) Notice: Subject to any disclaimer, the term of this patent is extended or adjusted under 35 U.S.C. 154(b) by 140 days.

(21) Appl. No.: 14/944,877

(22) Filed: Nov. 18, 2015

(65) Prior Publication Data

US 2017/0141683 A1   May 18, 2017

(51) Int. Cl.
  *G05F 1/40* (2006.01)
  *H02M 3/158* (2006.01)
  *H02M 1/32* (2007.01)
  *H02M 1/00* (2006.01)

(52) U.S. Cl.
  CPC ............ *H02M 3/158* (2013.01); *H02M 1/32* (2013.01); *H02M 3/1588* (2013.01); *H02M 2001/0009* (2013.01)

(58) Field of Classification Search
  CPC ...... H02M 3/158; H02M 1/32; H02M 3/1588; H02M 3/1582; H02M 2001/0045; H02M 2001/0067
  See application file for complete search history.

(56) References Cited

U.S. PATENT DOCUMENTS 5,892,389 A * 4/1999 Lai ...................... H01H 47/325
                                                              323/277

* cited by examiner

*Primary Examiner* — Adolf Berhane
*Assistant Examiner* — Afework Demisse
(74) *Attorney, Agent, or Firm* — Shumaker & Sieffert, P.A.

(57) ABSTRACT

A synchronous regulator controller, including a synchronous switch that is coupled between a first node and a second node. The controller also includes a first voltage divider that includes a first resistive device that is coupled between the first node and a third node, and a second resistive device that is coupled between the third node and a second node. The controller also includes a comparator having a first input that is coupled to the first node, and a second input that is coupled to a forth node. The controller also includes a current source that is arranged to provide a current to the fourth node. The controller also includes a third resistive device that is coupled between the third node and the fourth node.

20 Claims, 10 Drawing Sheets

CURRENT THRESHOLD DETECTION IN SYNCHRONOUS REGULATION

TECHNICAL FIELD

This disclosure relates to synchronous regulators, and more specifically zero-crossing detection and overload protection in synchronous regulator controllers.

BACKGROUND

Zero-Crossing Detection (ZCD) is a subsystem in some synchronous Integrated DC/DC Power Converters, particularly DC/DC Stepdown Converters (Buck). Forced CCM (Continuous Conduction Mode) operation is often undesired compared to DCM (Discontinuous Conduction Mode), due to huge efficiency drops, usually in the mid-load/low-load range.

Overload Detection (OVL) plays a role in synchronous Integrated DC/DC Power Converters as well. OVL provides a limiting current mechanism across the low-side power switch of a buck converter, and prevents current runaways in case of buck converters having an output shorted to ground.

Many conventional synchronous converters do not use zero-crossing detection, and instead use forced CCM, because the complexity of zero-crossing detection can potentially introduce risks, accuracy issues, and critical control.

SUMMARY

In general, the disclosure is directed to a method and device in which a synchronous regulator controller includes a synchronous switch that is coupled between a first node and a second node. The controller also includes a first voltage divider that includes a first resistive device that is coupled between the first node and a third node, and a second resistive device that is coupled between the third node and a second node. The controller also includes a comparator having a first input that is coupled to the first node, and a second input that is coupled to a forth node. The controller also includes a current source that is arranged to provide a current to the fourth node. The controller also includes a third resistive device that is coupled between the third node and the fourth node.

In some examples, a device comprises a synchronous regulator controller, including: a synchronous switch that is arranged to receive an inductor current; a first voltage divider that is arranged in parallel with the synchronous switch to sense a portion of the inductor current, wherein the first voltage divider includes a first resistive device and a second resistive device that is coupled to the first resistive device; a comparison circuit that is arranged to determine whether the inductor current has reached a threshold, wherein the comparison circuit includes: a third resistive device that is arranged to provide a differential comparison voltage by offsetting a voltage across the second resistive device; a first current source that is arranged to provide a current to the third resistive device such that the offset of the voltage across the second resistive device corresponds to the threshold; and a comparator that is arranged to determine whether the inductor has reached the threshold by performing a comparison based on the differential comparison voltage.

In some examples, a method comprises driving a synchronous switch that is arranged to receive an inductor current; using a voltage divider that is arranged in parallel with the synchronous switch to sense a portion of the inductor current; providing a differential comparison voltage by offsetting a voltage across a portion of the voltage divider; and performing a comparison based on the differential comparison voltage.

In some examples, a device comprises means for driving a synchronous switch that is arranged to receive an inductor current; means for using a voltage divider that is arranged in parallel with the synchronous switch to sense a portion of the inductor current; means for providing a differential comparison voltage by offsetting a voltage across a portion of the voltage divider; and means for performing a comparison based on the differential comparison voltage.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

DETAILED DESCRIPTION

Figure 1:
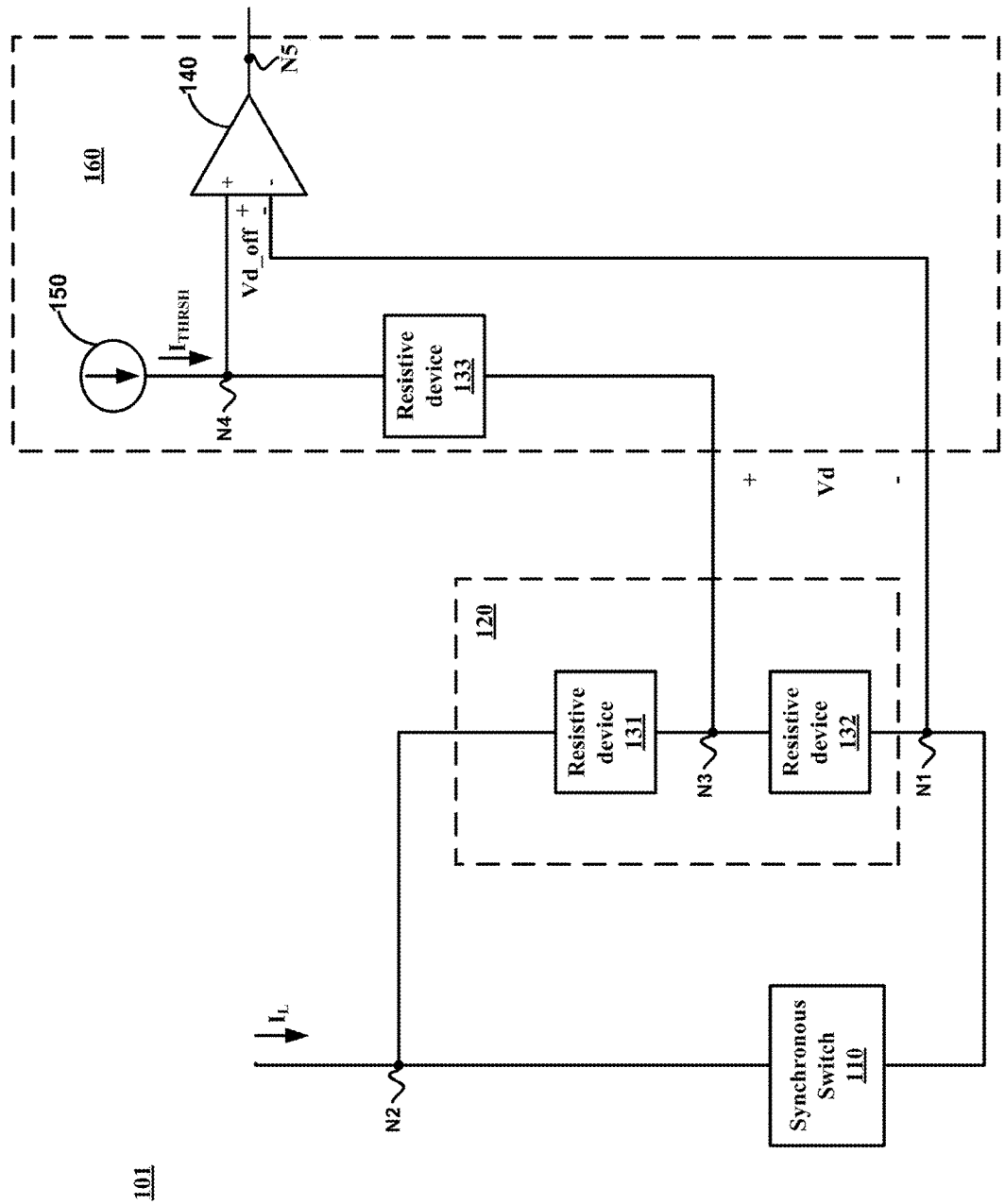
FIG. 1 is a block diagram illustrating an example of a synchronous regulator controller.

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," or "in one example," as used herein does not necessarily refer to the same embodiment or example, although it may. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal.

FIG. 1 is a block diagram illustrating an example of synchronous regulator controller 101. Synchronous regulator controller 101 includes synchronous switch 110, voltage divider 120, and comparison circuit 160. Voltage divider 120 includes resistive device 131 and resistive device 132. Comparison circuit 160 includes comparator 140, current source 150, resistive device 133.

Synchronous switch 110 is coupled between node N1 and node N2. Resistive device 131 is coupled between node N2 and node N3. Resistive device 132 is coupled between node N3 and node N1. Comparator 140 has a first input that is coupled to node N1, a second input that is coupled to node N4, and an output that is coupled to node N5. Current source 140 is arranged to provide threshold current ITHRSH to node N4. Resistive device 133 is coupled between node N3 and node N4.

Resistive devices 131, 132, and 133 do not necessarily operate as resistive device at all times, but in some examples are biased to operate as ohmic devices when synchronous switch 110 is on. Comparator 140 is shown in one particular polarity in the example illustrated in FIG. 1; however, in some examples, the polarity of comparator 140 is reversed from the polarity literally shown in FIG. 1.

Synchronous switch 110 is arranged to receive inductor current $I_L$. Comparison circuit 160 is arranged to determine whether inductor current $I_L$ has reached a threshold. For instance, in some examples, comparison circuit 160 is arranged to determine whether current $I_L$ has reached zero. In some examples, comparison circuit 160 is arranged to determine whether current $I_L$ has reached an overload threshold. In some examples, comparison circuit 160 has more components than shown in FIG. 1, and is arranged to determine whether current $I_L$ has reached any one of two or more threshold. For instance, in some examples, comparison circuit 160 is arranged to determine whether current $I_L$ has reached zero or an overload threshold.

Voltage divider 120 is arranged to sense a portion of the inductor current $I_L$. In operation, differential voltage Vd appears across resistive device 132 between nodes N1 and N3. Resistive device 133, in conjunction with threshold current Ithrsh, offsets voltage Vd to provide differential comparison voltage Vd_off between nodes N1 and N4. Current source 150 is arranged to provide threshold current Ithresh to node N4 such that the offset (that is, the offset of differential comparison Vd_off relative to voltage Vd) corresponds to the threshold. Comparator 140 is arranged to determine whether inductor current $I_L$ has reached the threshold by comparing the voltage at node N1 with the voltage at node N4.

In a switching regulator there is one or more "main switch" that switches on and off to perform the switching regulation. The output signal is rectified in order to provide a DC output signal. There are two types of switching regulators: asynchronously-rectified regulators (also simply referred to as asynchronous regulators) and synchronously-rectified regulators (also simply referred to as synchronous regulators. An asynchronous rectifier typically uses a diode to perform the rectification. A synchronous rectifier uses a switch to perform the rectification. The switch that performs the rectification may be referred to as a "synchronous switch" (or "synchronous FET" in the case where the synchronous switch is a FET), to differentiate the synchronous switch from the main switch, which performs the regulation. In a synchronous buck converter, there is a high-side switch which is the main switch, and a low-side switch which is the synchronous switch. In a synchronous boost converter, there is a high-side switch which is the synchronous switch, and a low-side switch which is the main switch. A buck-boost converter using an H-bridge topology has two main switches and two synchronous switches. A synchronous regulator may be employed as part of a switch-mode power supply (SMPS).

A synchronous regulator can operate in both continuous conduction mode (CCM) and discontinuous conduction mode (DCM). A synchronous regulator is operating in CCM when the inductor current is continuous during the entire switching cycle, and the synchronous regulator is operating in DCM when the inductor current is discontinuous for some portion of the switching cycle. In DCM mode of a synchronous regulator, the inductor current is not allowed to go below zero, and so when the inductor current reaches zero, the inductor current remain at zero until the inductor current rises above zero. In contrast, in CCM mode, the inductor current never falls to zero and is therefore continuous through the entire switching cycle. It would be possible to operate in CCM mode when the inductor current falls to zero, by allowing the inductor current to drop below zero, but this would result in poor efficiency, so instead a synchronous converter generally operates in DCM mode when the inductor current falls to zero during a switching cycle.

For synchronous regulators that operate in DCM mode when the inductor currents falls to zero during a switching cycle, zero-crossing detection is used so that the synchronous switch may be used to prevent the inductor current from falling below zero. Proper functionality, good accuracy, and fast response time are important parameters for zero-crossing detection used in synchronous regulators.

FIG. 1 represents various open-ended examples of a portion synchronous regulator controller 101 that does not necessarily show all components or connections present in power converter 101. Nodes without connections in FIG. 1 are not necessarily floating nodes, and devices not shown in FIG. 1 is not intended to indicate that complete functionality can necessarily be accomplished without such devices.

Rather, FIG. 1 is an open-ended drawing that is intended to encompass many different examples, where several such examples are illustrated and discussed in greater detail below.

Figure 2:
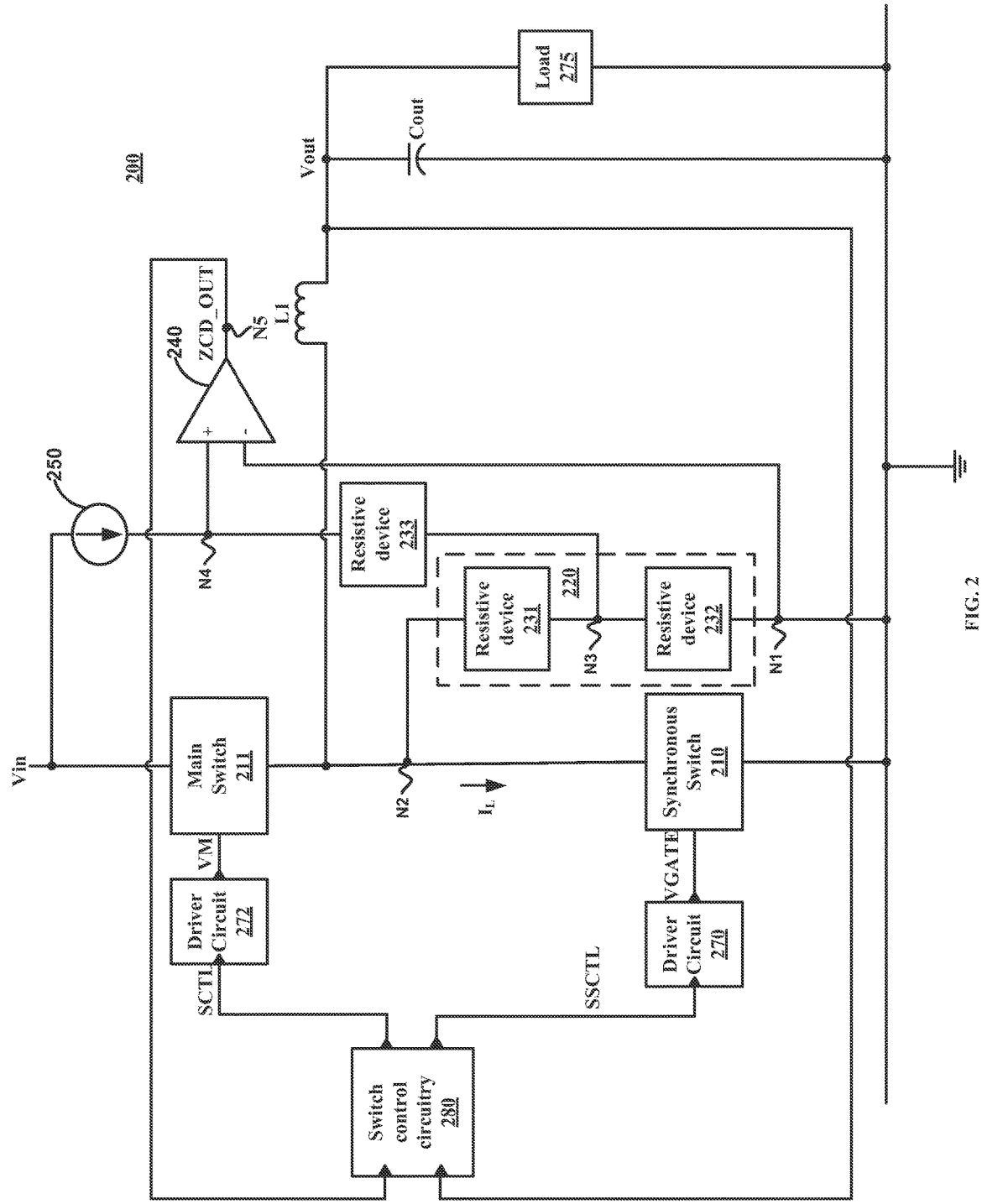
FIG. 2 is a block diagram illustrating an example of a synchronous regulator that includes the synchronous regulator controller of FIG. 1.

FIG. 2 is a block diagram illustrated synchronous regulator 200 (driving load 275), which includes synchronous regulator controller 201, which may be employed as an example of synchronous regulator controller 101 of FIG. 1. Synchronous regulator controller 201 further includes switch control circuitry 280, driver circuit 270, and driver circuit 272. Synchronous regulator 200 further includes main switch 211, inductor L1, and output capacitor L1. The specific example of synchronous regulator 200 illustrated in FIG. 2 is a synchronous buck regulator that provides regulated output voltage Vout, which in turn drives load 275.

In operation, inductor L1 provides inductor current $I_L$. Also, capacitor Cout is an output capacitor for synchronous regulator 200. Switch control circuitry 280 is arranged to provide switch control signal SCTL and synchronous switch control signal SSCTL based, in part, on voltage Vout or a feedback signal that is based in part on voltage Vout. In one embodiment, driver circuit 272 is arranged to provide driver output signal VM from switch control signal SCTL, and driver 270 is arranged to provide signal VGATE from synchronous switch control signal SSCTL. Additionally, main switch 211 is configured to open and close responsive to signal VM, and synchronous switch 210 is configured to open and close responsive to signal VGATE. In some examples, synchronous switch 210 and main switch 211 each include a power transistor.

Switch control circuitry 280 is arranged to provide signal SCTL from output voltage Vout or a feedback signal that is based on output voltage Vout to control regulation. In one example, synchronous regulator 200 is a PWM buck regulator controller, and switch control circuitry 280 includes an error amp and a pulse width modulation circuit.

Switch control circuitry 280 is further arranged to provide synchronous switch control signal SSCTL based, at least in part, on comparator output signal ZCD_OUT and output voltage Vout (or a feedback signal that is based on Vout). In some examples, under normal operating conditions, signal SSCTL is provided as the logical opposite of signal SCTL, so that main switch 211 and synchronous switch 210 may be controlled so that synchronous switch 210 is on whenever main switch 211 is off, and vice versa. There are, however, conditions in which switch control circuitry 280 may provide signal SSCTL so that this is not the case. For instance, in some examples, switch control circuitry 280 may implement a break-before-make scheme, so that there is a slight delay when main switch 211 turns off before synchronous switch 210 turns on. Additionally, in some examples, switch control circuitry 280 provides signal SSCTL to turn synchronous switch 210 off when signal ZCD_OUT is asserted.

Although FIG. 2 shows a buck converter topology, any suitable synchronous converter architecture may be employed. For example, boost converters, buck-boost converters, split-pi converters, CUK converters, SEPIC converters, zeta converters, isolated DC/DC topologies, AC/DC topologies, and/or the like may be employed. Also, although PWM control is discussed above, any suitable form of control may be employed, including, for example, PFM (pulse frequency modulation) and PDM (pulse density modulation).

Figure 3:
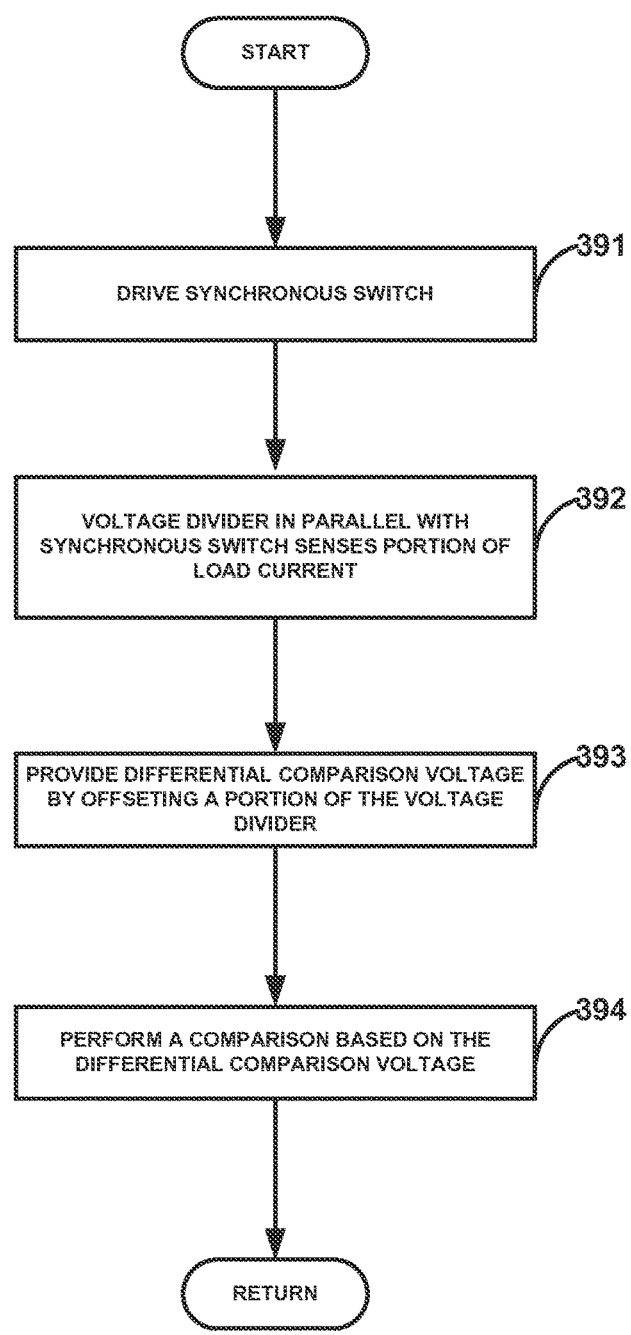
FIG. 3 is a flowchart illustrating an example of a process that may be employed by an example of the synchronous regulator controller of FIG. 1 and/or the synchronous regulator of FIG. 2.

FIG. 3 is a flowchart illustrating an example of a process 390, which may be employed by an example of synchronous regulator controller 101 and/or synchronous regulator 200 of FIG. 2. A driver circuit (e.g., driver 270 of FIG. 2) drives a synchronous switch (e.g., synchronous switch 110 of FIG. 1 or synchronous switch 210 of FIG. 2) that is arranged to receive an inductor current (e.g., inductor current $I_L$ of FIG. 1 or FIG. 2) (391). A voltage divider (e.g., voltage divider 120 of FIG. 1) that is arranged in parallel with the synchronous switch senses a portion of the inductor current (392). Resistive devices (e.g., 131-133 of FIG. 1) and a current source (e.g., current source 140 of FIG. 1) provide a differential comparison voltage (Vd_off) by offsetting a voltage (Vd) across a portion of the voltage divider (393). Comparator 140 is arranged to perform a comparison based on the differential comparison voltage (394).

Figure 4:
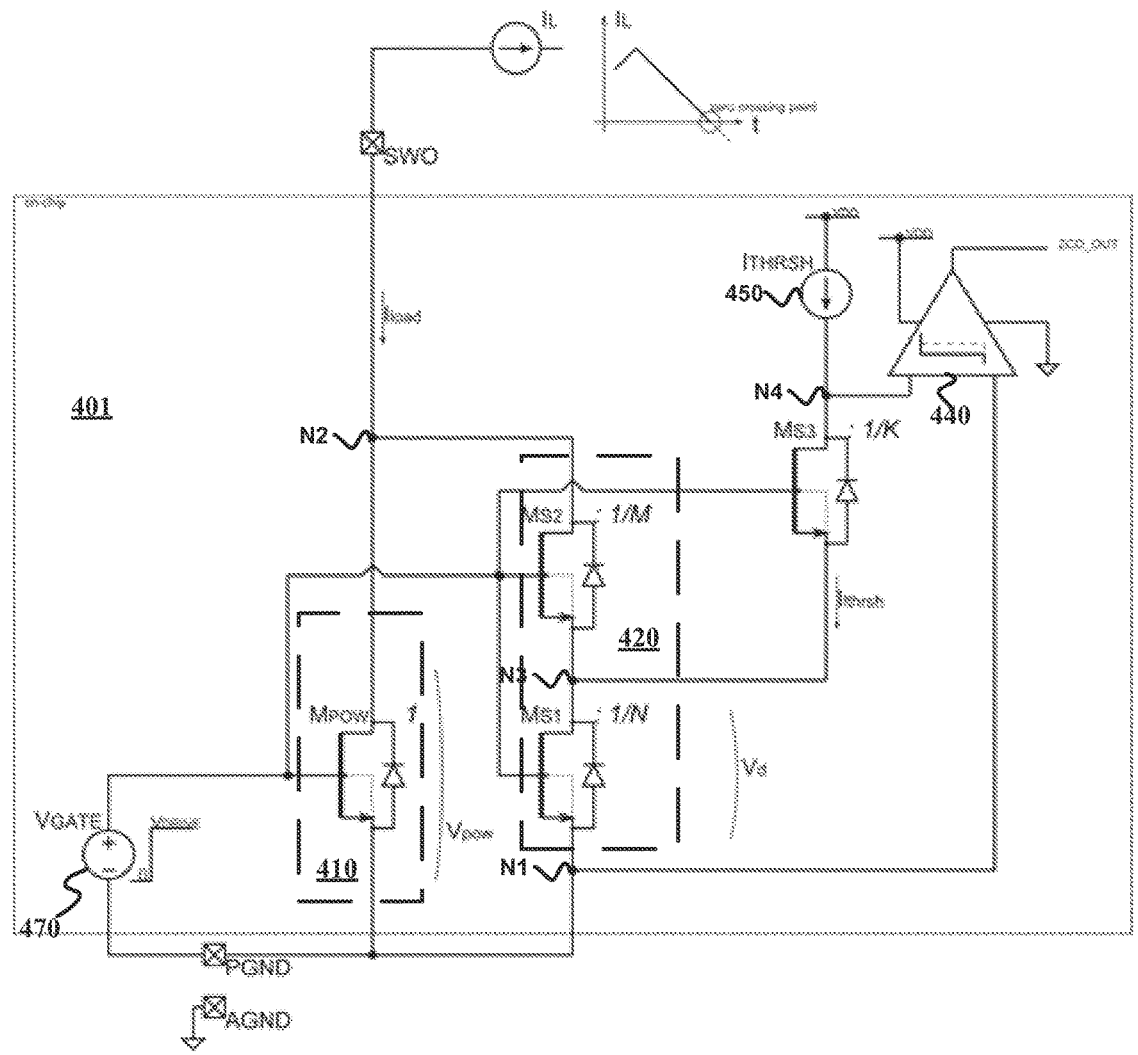
FIG. 4 is a block diagram illustrating an example of the synchronous regulator controller of FIG. 1 in which the resistive devices are MOSFETs biased in the ohmic region.

FIG. 4 is a block diagram illustrating an example of the synchronous regulator controller 401, which may be employed as an example of synchronous regulator controller 101 of FIG. 1. Synchronous switch 410 includes power MOSFET MPOW. MOSFETs MS1-MS3 are examples of resistive devices 131-133, respectively, of FIG. 1. Synchronous regulator controller 401 further includes driver circuit 470.

Driver circuit 470 is arranged to output drive voltage VGATE to the gates of transistors MPOW and MS1-MS3. While synchronous switch 410 is to be on in accordance with control provided by synchronous regulator controller 401, driver circuit 470 outputs signal VGATE at a high voltage level, VDrive, which causes transistors MPOW and MS1-MS3 to be biased in their ohmic regions so that they each operate as resistances.

An enhancement mode MOSFET has three different modes of operation: cutoff mode, ohmic mode, and saturation mode. The mode of operation depends on the voltages at the three terminals of the MOSFET. A MOSFET, or any device that is operating in an ohmic mode, operates as a resistor or as a resistance in that it obeys Ohm's law, that is, the voltage across the device is proportional to current through the device.

Voltage divider 420 is arranged as a partition of power transistor MPOW that is arranged to sense a defined portion of the total inductor current $I_L$.

In some examples, the output of comparator 460 is employed for zero-crossing detection, so that comparator output signal ZCD_OUT is asserted when a zero-crossing detection event occurs. In other examples, the output of comparator 460 is employed for overload detection, so that comparator output signal ZCD_OUT is asserted when an overload event occurs. Some examples of regulator controller 401 includes one comparator for zero-crossing detection and another comparator for overload detection, as discussed in greater detail below.

In some examples, transistors MPOW and MS1-MS3 are all on the same integrated circuit and are all matched together. In one example, transistors MPOW and MS1-MS3 are each nMOSFETs, which, which biased to operate as ohmic devices, each have a resistance that resistance is given approximately by the following equation: $Ron = 1/(2\ \mu\_n/C\_OX\ W/L\ (V\_GS - V\_TH))$.

The voltage drop across MPOW (drain-to-source voltage), named Vpow, is partitioned via MS1 and MS2, leading to a voltage drop Vd. Simultaneously, a voltage drop appears across MS3, related to the reference current ITHRSH. In one particular zero-crossing detection example, when the voltage Vd (drain-to-source voltage of MS1) equals with opposite sign the drain-to-source voltage of MS3, the comparator changes its output logic state. In other examples, synchronous regulator controller 401 is instead configured for overload detection.

According to the comparator polarity in the example depicted in FIG. 4, in the specific zero-crossing detection example discussed above, if comparator output ZCD_OUT is set to a low logic state (for an example in which ZCD_OUT is asserted high), and current $I_L$ is decreasing (load current Iload increasing), as soon as Vd equals with opposite sign the drain-to-source voltage of MS3, ZCD_OUT will move to a high logic state. In this example, the $I_L$ at which the comparator changes its state is designed to be small (but still positive).

In one overload detection example, when comparator output ZCD_OUT is set to a high logic state, and the current $I_L$ is increasing (Iload decreasing), as soon as Vd equals with opposite sign the drain-to-source voltage of MS3, ZCD_OUT will move to a low logic state. In this example the $I_L$ at which the comparator changes its state normally is designed to be large (positive).

In some examples, when signal ZCD_OUT is asserted, control circuitry (e.g., control circuit 280 of FIG. 2) causes driver circuit 470 to control synchronous switch 410 to turn off, and to remain off until the next switching cycle begins. In the case of zero-crossing detection, this causes synchronous regulator controller 401 to operate in DCM mode rather than forced CCM, which results in increased efficiency. In this case of overload detect, this protects synchronous switch 410 and external components from damage during an overload condition. Additionally, when signal ZCD_OUT is asserted in the overload case, the assertion of signal ZCD_OUT is used by control circuit 280 as the indication of a fault condition.

As discussed above, when signal ZCD_OUT is asserted, the control circuitry may control synchronous switch 410 to turn off, and to not allow synchronous switch 410 turn to turn on until the next switching cycle begins Additionally, in some examples, after signal ZCD_OUT is asserted, the control circuitry resets comparator 440 at the beginning of the next switching cycle, so that signal ZCD_OUT returns to the logic level that is not asserted at the beginning of the next switching cycle.

Although MOSFETs are discussed above, transistors MPOW and MS1-MS3 may include any suitable devices, including, for example, JFETs.

Figure 5:
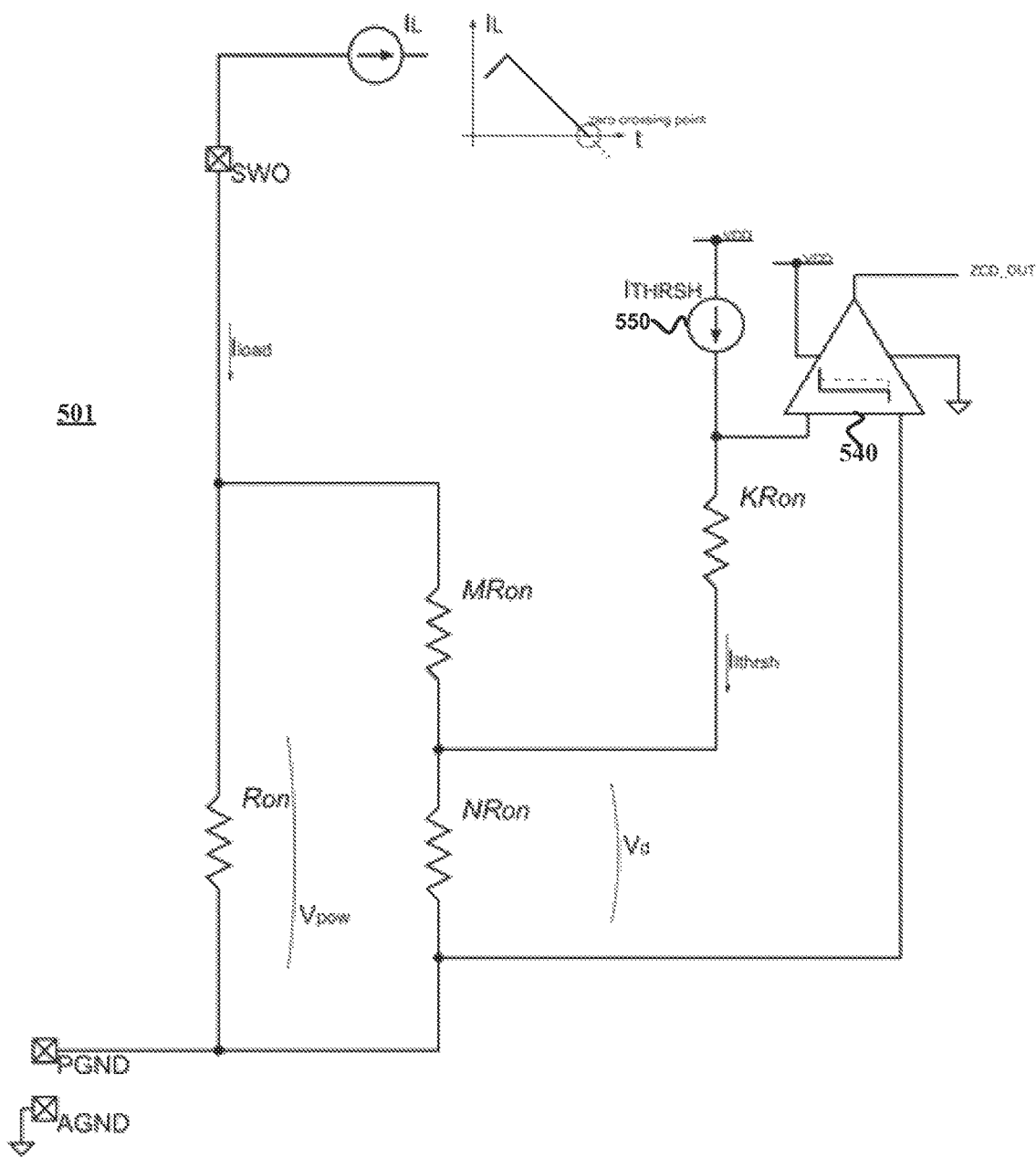
FIG. 5 is a block diagram illustrating an equivalent circuit of the synchronous regulator controller of FIG. 4.

FIG. 5 is a block diagram illustrating an equivalent circuit 501 of synchronous regulator controller 401 of FIG. 4.

The equivalent circuit 501 may be used to derive design formulas. The factor N may be considered as the ratio between the aspect ratio W/L of MPOW and the aspect ratio W/L of MS1. If MS1 and MPOW have the same length L, N is the ratio between the width of MPOW and the width of MS1. The same applies for M and K factors.

The relationship between $I_L$ and ITHRSH at the comparator trigger point (when the comparator changes its output state, that is, when the differential voltage at its inputs is 0) is derived in the following.

$$Vd + K \cdot Ron \cdot I\_THRSH = 0 \qquad (1)$$

$$N/(M+N+1) \cdot I\_(load\_zcd) \cdot Ron + N(M+1)/(M+N+1) \\ \cdot I\_THRSH \cdot Ron = -K \cdot I\_THRSH \cdot Ron \qquad (2)$$

$$I\_(load\_zcd) = -I\_THRSH\ [K(M+N+1/N+(M+1)] = -I\_THRSH \cdot \alpha\_ZCD \qquad (3)$$

$$\alpha\_ZCD = (K(M+N+1))/N+(M+1) \qquad (4)$$

In most examples, the second term is negligible compared to the first term. Hence, the following reduction may be applied:

$$\alpha\_ZCD \cong (K(M+N+1))/N \cong (K(M+N))/N \qquad (5)$$

αZCD, also in its complete expression, depends just on M, N and K, which may be integer or fractional, and their tolerance (accuracy) depends just on matching accuracy among devices of the same type, which is usually well controlled in modern silicon processes.

Accordingly, the static threshold set by the presented system is independent of process variations, temperature and FETs overdrive voltage. Furthermore, the proposed solution can be considered as lossless, since such detection does not lead to any efficiency drop.

All of the processing parts (ITHRSH, comparator) in this example are located in a low-voltage part, allowing the use of more performant devices (i.e., in terms of matching). Accordingly, separation from the high voltage/noisy part may be achieved.

In some examples, reference current ITHRSH may by adjusted and controlled in an efficiency control loop.

Figure 6:
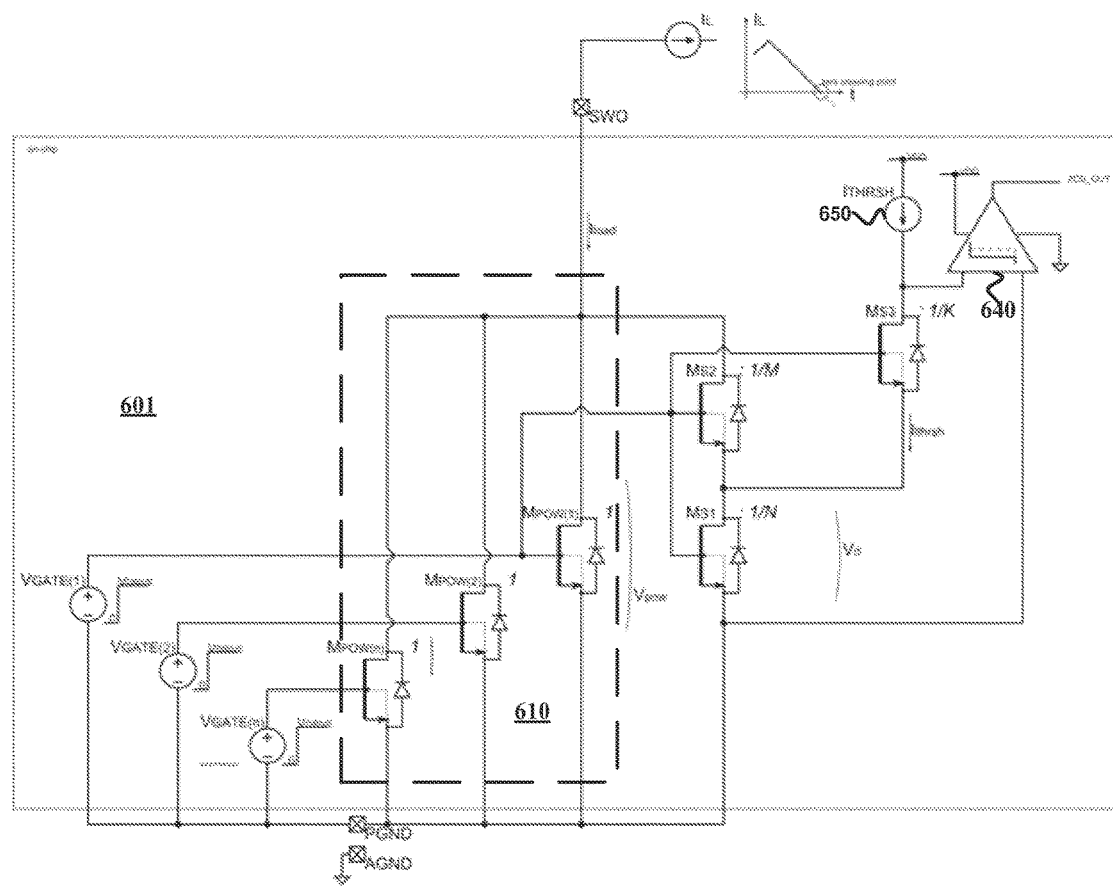
FIG. 6 is a block diagram illustrating an example of the synchronous regulator controller of FIG. 4 in which the synchronous switch includes multiple power transistors.

FIG. 6 is a block diagram illustrating an example of synchronous regulator controller 601, which may be employed as an example of synchronous regulator controller 401 of FIG. 4. In synchronous regulator controller 601, synchronous switch 610 includes multiple power transistors (e.g., power transistors MPOW(1), MPOW(2), and MPOW(3)). Driver circuit 670 is arranged to output multiple drive voltages (e.g., VGATE(1)-VGATE(3)), one for each respective power transistor in synchronous switch 610.

In some examples, current ITHRSH is adjustable based on which transistors in synchronous switch 610 are being used. In some examples, current ITHRSH is a fixed percentage of the maximum current.

In the example illustrated, multiple power devices (n power devices) may be switched on or off. Given the number of switched on devices non (1≤n_on≤n), equation (4) becomes:

$$\alpha\_ZCD = n\_on\ [(K(M+N+1/n\_on))/N+(M+1/n\_on)] \qquad (6)$$

After a reduction (see above):

$$\alpha\_ZCD \cong n\_on\ [(K(M+N))/N] \qquad (7)$$

Figure 7:
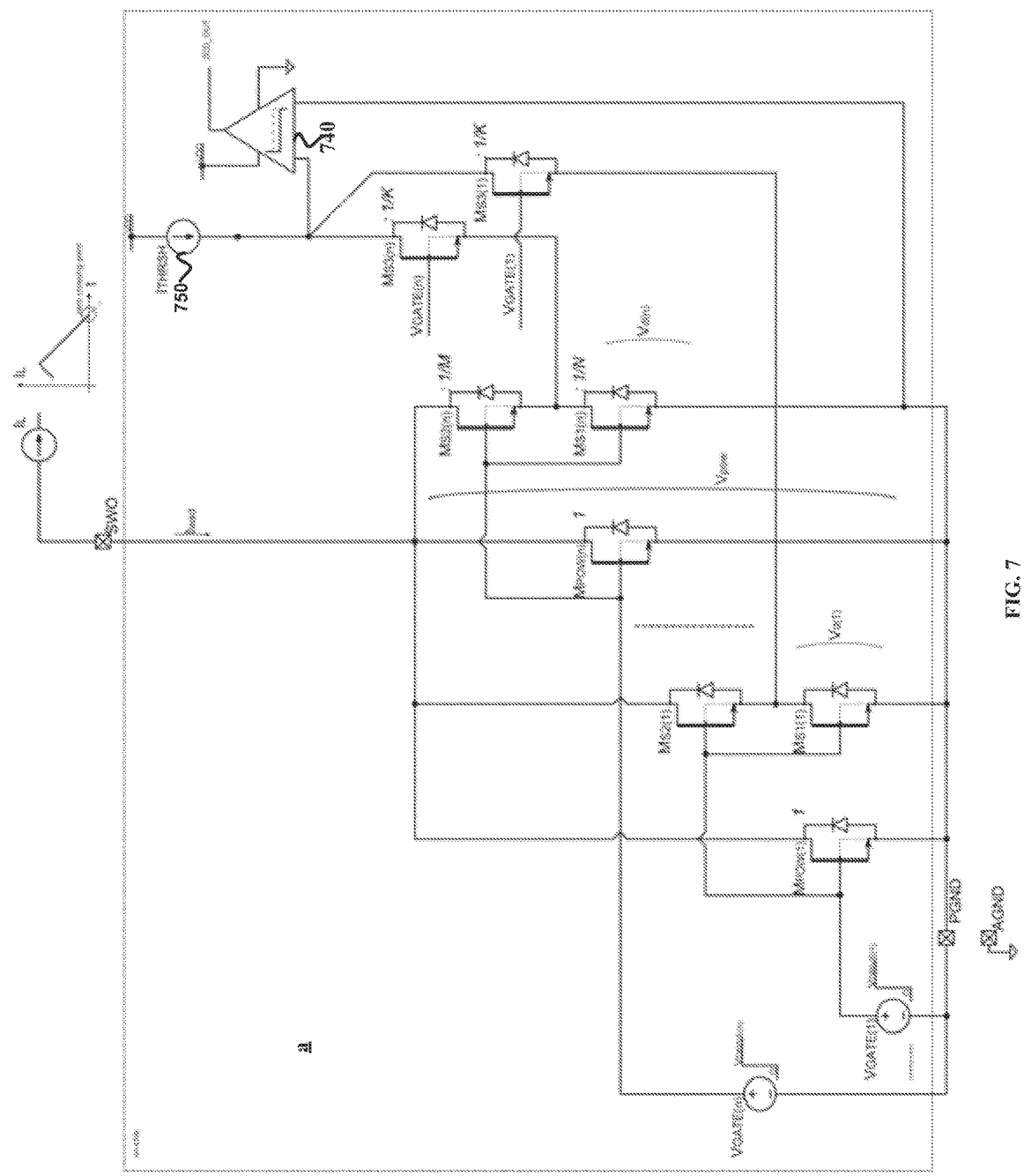
FIG. 7 is a block diagram illustrating an example of the synchronous regulator controller of FIG. 6 in which each separate power transistor of the synchronous switch has its own respective sensing circuitry.

FIG. 7 is a block diagram illustrating an example of synchronous regulator controller 701, which may be employed as an example synchronous regulator controller 601 of FIG. 6. In synchronous regulator controller 701, each separate power transistor (e.g., MPOW(1)-MPOW(n)) of the synchronous switch has its own respective sensing circuitry (e.g., MS1(1), MS2(1), and MS3(1) through MS1($n$), MS2 ($n$) and MS3($n$)). In some examples, each separate power transistor is a separate finger of the synchronous switch. In various examples, the driving voltage VGATE(1)-VGATE (n) may be the same as each other, or different from each other, and synchronous regulator controller 701 operates substantially independently of the VGATE voltages having different voltages, as well as being substantially independent of process and temperature.

Some examples of synchronous regulator controller 701 have programmable thresholds by acting on reference current source 740, as well employing a trimming procedure. While the threshold is substantially independent of process, temperature, and driver voltage, there is still device mismatch to be taken into account. In some examples, reference current source 740 is adjusted for device mismatch.

Figure 8:
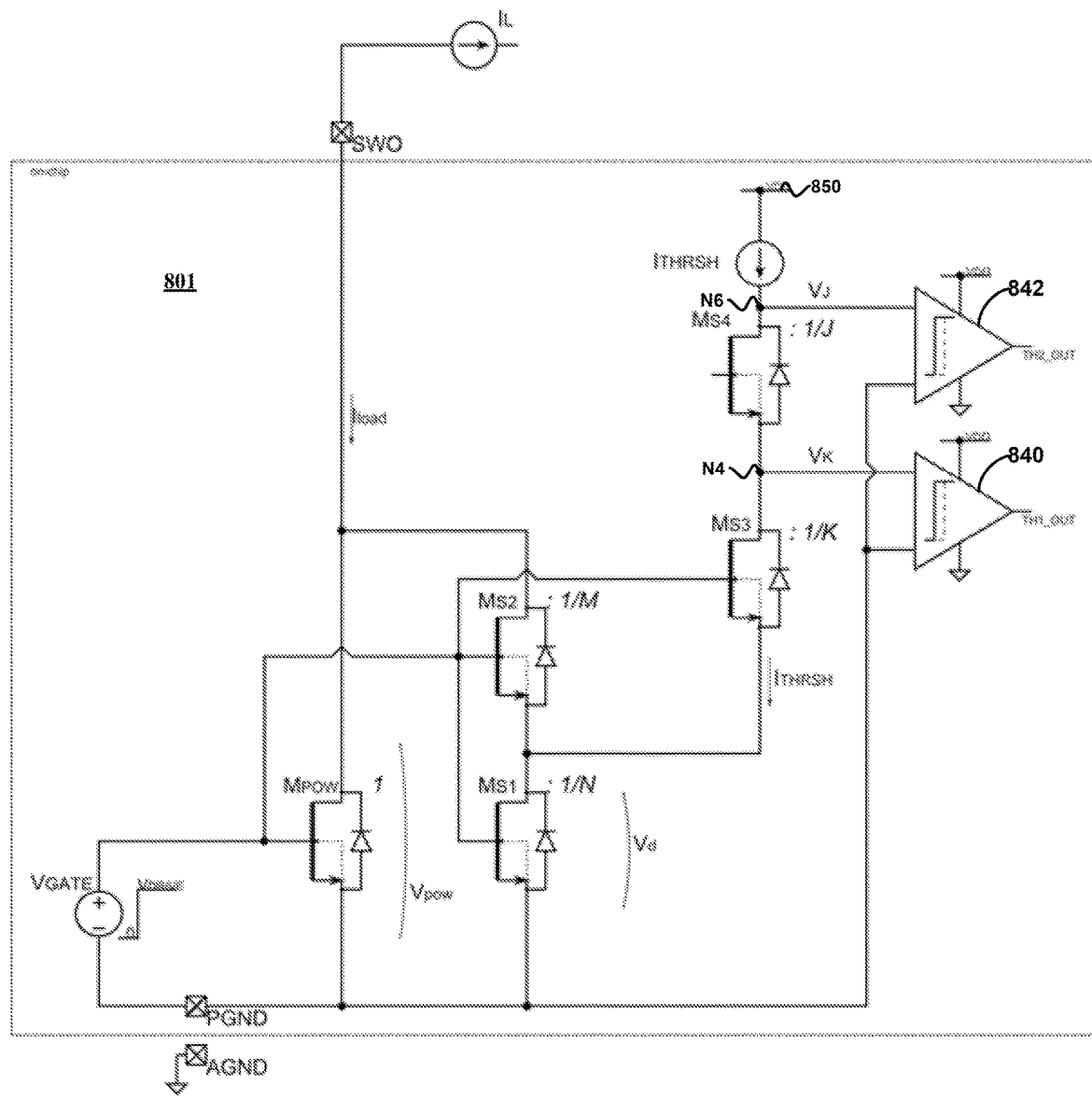
FIG. 8 is a block diagram illustrating an example of the synchronous regulator controller of FIG. 4 that includes both zero-crossing detection and overload protection.

FIG. 8 is a block diagram illustrating an example of synchronous regulator controller 801, which may be employed as an example of synchronous regulator controller 401 of FIG. 4. Synchronous regulator controller 401 further includes comparator 842 and transistor MS4. Synchronous regulator controller 801 includes both zero-crossing detection and overload protection.

In some examples, synchronous regulator controller 801 provides ZCD and OVL detection by replicating the power device sense (transistors MS1 and MS2) as well as the reference transistor MS3 with bias ITHRESH and the related comparator.

The two thresholds for TH1 and TH2, ZCD and OVL, can be chosen by modifying the ratio of transistors MS3 and MS4 as well as their biasing current ITHRSH_K and ITHRSH_J.

The first threshold is identified by comparator output TH1_OUT, which is used for zero-crossing detection:

$$I\_(load\_TH1)=-I\_THRSH[K+(1+M)N/(1+M+N)](1+M+N)/N=-I\_THRSH\,[K(1+M+N)/N+(1+M)] \quad (7)$$

The second threshold is related to comparator output TH2_OUT, which is used for overload detection:

$$I\_(load\_TH2)=-I\_THRSH\,[(J+K)\,(1+M+N)/N+(1+M)]=-I\_THRSH\,J(1+M+N)/N-I\_(load\_TH1) \quad (8)$$

The two current thresholds can be therefore settled independently to create ZCD and OVL by modifying the ratios J and K with the advantage of using a single power device sensing and of exploiting a single biasing current ITHRSH.

Figure 9:
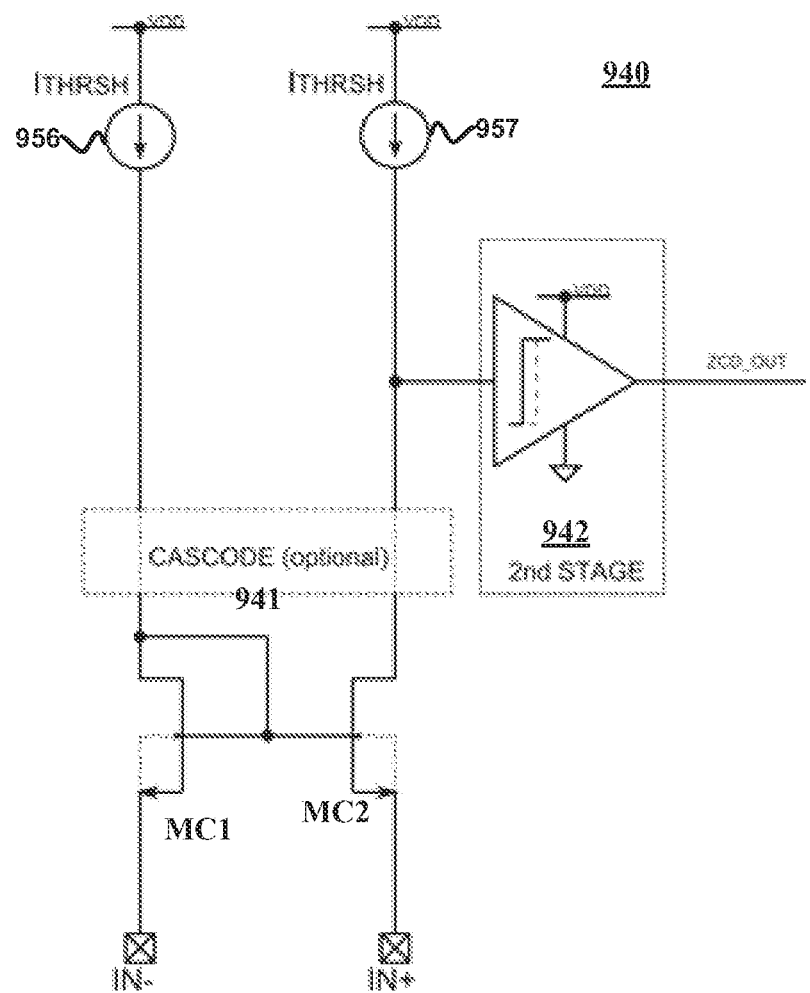
FIG. 9 is a block diagram illustrating an example of the comparator of FIG. 4.

FIG. 9 is a block diagram illustrating an example of comparator 940, which may be employed as an example of comparator 440 of FIG. 4. Comparator 940 includes cascode stage 941 and output stage 942. Cascode stage 941 includes transistor MC1, transistor MC2, current source 956, and current source 957. In some examples, transistors MC1 and MC2 are two equal N-FETs are used to detect the differential voltage between the two input signals IN− and IN+. Output stage 942 is arranged to output comparator output signal ZCD_OUT in response to the voltage at the drain of transistor MC2. Comparator 940 is an example of a continuous time solution for comparator 440.

Figure 10:
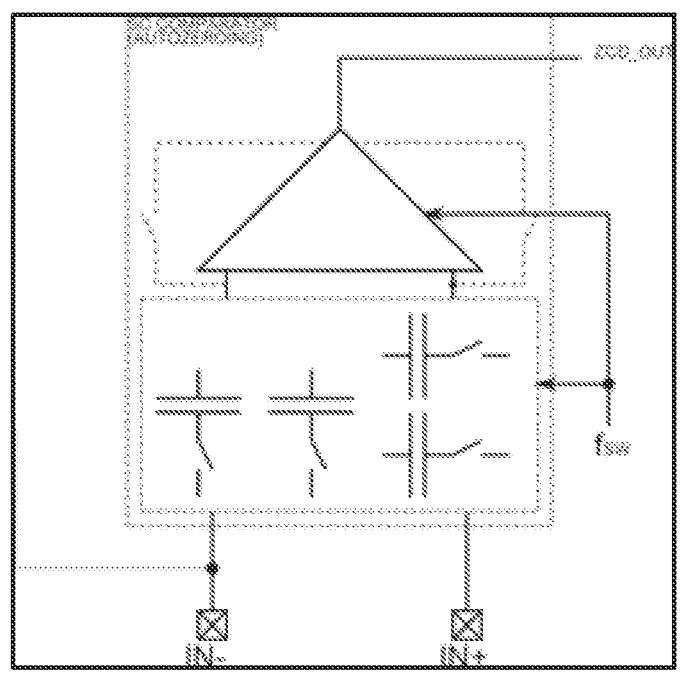
FIG. 10 is a block diagram illustrating an example the comparator of FIG. 4 that includes a switched-capacitor architecture, in accordance with aspects of the present disclosure.

FIG. 10 is a block diagram illustrating an example of comparator 1040, which may be employed as an example of comparator 440 FIG. 4. Comparator 1040 is an example of a discrete time solution for comparator 440.

Comparator 1040 includes a switched-capacitor architecture with autozeroing technique that allows great accuracy for threshold detection. In some examples, a fully differential structure may be implemented to improve the susceptibility of the system. In some examples, the same clock used as the converter switching frequency may be used for the switched-capacitor architecture, using system on/off phases for the first phase (offset capture/autozeroing) and the second phase (comparison), where the off phase is occurring when zero crossing detection and/or overload detection are running.

Some examples of the disclosure are described below.

Example 1

A device, comprising: a synchronous regulator controller, including: a synchronous switch that is arranged to receive an inductor current; a first voltage divider that is arranged in parallel with the synchronous switch to sense a portion of the inductor current, wherein the first voltage divider includes a first resistive device and a second resistive device that is coupled to the first resistive device; a comparison circuit that is arranged to determine whether the inductor current has reached a threshold, wherein the comparison circuit includes: a third resistive device that is arranged to provide a differential comparison voltage by offsetting a voltage across the second resistive device; a first current source that is arranged to provide a current to the third resistive device such that the offset of the voltage across the second resistive device corresponds to the threshold; and a comparator that is arranged to determine whether the inductor has reached the threshold by performing a comparison based on the differential comparison voltage.

Example 2

The device of example 1, wherein the synchronous switch includes at least one power transistor.

Example 3

The device of any combination of examples 1-2, wherein synchronous device, first resistive device, the second resistive device, and third resistive device are all on a same integrated circuit.

Example 4

The device of any combination of examples 1-3, wherein the first resistive device, the second resistive device, and the third resistive device each include a transistor.

Example 5

The device of any combination of examples 1-4, wherein the first resistive device, the second resistive device, and the third resistive device each include a transistor that is arranged to operate in an ohmic region while the synchronous switch is on.

Example 6

The device of any combination of examples 1-5, wherein the synchronous regulator controller further includes a driver circuit having an output, wherein the first resistive device, the second resistive device, the third resistive device, and the synchronous switch each include a field effect transistor including a gate that is coupled to the output of the driver circuit.

Example 7

The device of any combination of examples 1-6, wherein the comparator is arranged to provide a comparator output signal at the output of the comparator, the synchronous regulator controller further includes control circuitry that is arranged to control the driver circuit to turn the synchronous switch on and off in accordance with modulation control, and to control the driver circuit to turn the synchronous switch off when the comparator output signal is asserted.

Example 8

The device of any combination of examples 1-7, further comprising a power transistor that is arranged to operate as a high-side switch.

Example 9

The device of any combination of examples 1-8, wherein the comparator is arranged to provide a comparator output signal at the output of the comparator, and wherein the comparator and the current source are configured such that the comparator output signal is asserted when a zero-crossing detection event occurs.

Example 10

The device of any combination of examples 1-9, wherein the comparator is arranged to provide a comparator output signal at the output of the comparator, and wherein the comparator and the current source are configured such that the comparator output signal is asserted when an overload event occurs.

Example 11

The device of any combination of examples 1-10, wherein the comparison circuit is further arranged to determine whether the inductor current has reached a second threshold, and wherein the comparison circuit further includes: a fourth resistive device that is arranged to provide a second differential comparison signal that is based on the second threshold; and a second comparator that is arranged to determine whether the inductor has reached the second threshold by performing a comparison based on the second differential comparison voltage.

Example 12

The device of any combination of examples 1-11, wherein the synchronous switch includes a first finger and a second finger.

Example 13

The device of example 12, wherein the synchronous regulator controller further includes a second voltage divider that is coupled to second finger of the synchronous switch, and wherein the second voltage divider include a fourth resistive device and a fifth resistive device, and wherein the comparison circuit further includes a sixth resistive device that is coupled to the second voltage divider and the comparator.

Example 14

A method, comprising: driving a synchronous switch that is arranged to receive an inductor current; using a voltage divider that is arranged in parallel with the synchronous switch to sense a portion of the inductor current; providing a differential comparison voltage by offsetting a voltage across a portion of the voltage divider; and performing a comparison based on the differential comparison voltage.

Example 15

The method of example 14, further comprising: biasing a first resistive device in an ohmic region when the synchronous switch is on; and biasing a second resistive device in the ohmic region when the synchronous switch is on, wherein the voltage divider includes the first resistive device and the second resistive device.

Example 16

The method of any combination of examples 14-15, further comprising: outputting a comparison output signal based on the comparison; turning the synchronous switch on and off in accordance with pulse modulation control; and turning the synchronous switch off when the comparator output signal is asserted.

Example 17

The method of example 16, wherein performing the comparison is accomplished such that the comparator output signal is asserted when a zero-crossing detection event occurs.

Example 18

The method of any combination of examples 16-17, wherein performing the comparison is accomplished such that the comparator output signal is asserted when an overload event occurs.

Example 19

A device, comprising: means for driving a synchronous switch that is arranged to receive an inductor current; means for using a voltage divider that is arranged in parallel with the synchronous switch to sense a portion of the inductor current; means for providing a differential comparison voltage by offsetting a voltage across a portion of the voltage divider; and means for performing a comparison based on the differential comparison voltage.

Example 20

The device of example 19, further comprising: means for outputting a comparison output signal based on the comparison; means for turning the synchronous switch on and off in accordance with modulation control; and means for turning the synchronous switch off when the comparator output signal is asserted.

Various examples have been described. These and other examples are within the scope of the following claims.

What is claimed is:
1. A device, comprising:
a synchronous regulator controller, including:
   a synchronous switch that is arranged to receive an inductor current;
   a first voltage divider that is arranged in parallel with the synchronous switch to sense a portion of the inductor current, wherein the first voltage divider includes a first resistive device and a second resistive device that is coupled to the first resistive device;
   a comparison circuit that is arranged to determine whether the inductor current has reached a threshold, wherein the comparison circuit includes:
      a third resistive device that is arranged to provide a differential comparison voltage by offsetting a voltage across the second resistive device;
      a first current source that is arranged to provide a current to the third resistive device such that the offset of the voltage across the second resistive device corresponds to the threshold; and
      a comparator that is arranged to determine whether the inductor has reached the threshold by performing a comparison based on the differential comparison voltage.
2. The device of claim 1, wherein the synchronous switch includes at least one power transistor.

3. The device of claim 1, wherein synchronous device, first resistive device, the second resistive device, and third resistive device are all on a same integrated circuit.

4. The device of claim 1, wherein the first resistive device, the second resistive device, and the third resistive device each include a transistor.

5. The device of claim 1, wherein the first resistive device, the second resistive device, and the third resistive device each include a transistor that is arranged to operate in an ohmic region while the synchronous switch is on.

6. The device of claim 1, wherein the synchronous regulator controller further includes a driver circuit having an output, wherein the first resistive device, the second resistive device, the third resistive device, and the synchronous switch each include a field effect transistor including a gate that is coupled to the output of the driver circuit.

7. The device of claim 1, wherein the comparator is arranged to provide a comparator output signal at the output of the comparator, the synchronous regulator controller further includes control circuitry that is arranged to control the driver circuit to turn the synchronous switch on and off in accordance with modulation control, and to control the driver circuit to turn the synchronous switch off when the comparator output signal is asserted.

8. The device of claim 1, further comprising a power transistor that is arranged to operate as a high-side switch.

9. The device of claim 1, wherein the comparator is arranged to provide a comparator output signal at the output of the comparator, and wherein the comparator and the current source are configured such that the comparator output signal is asserted when a zero-crossing detection event occurs.

10. The device of claim 1, wherein the comparator is arranged to provide a comparator output signal at the output of the comparator, and wherein the comparator and the current source are configured such that the comparator output signal is asserted when an overload event occurs.

11. The device of claim 1, wherein the comparison circuit is further arranged to determine whether the inductor current has reached a second threshold, and wherein the comparison circuit further includes:
   a fourth resistive device that is arranged to provide a second differential comparison signal that is based on the second threshold; and
   a second comparator that is arranged to determine whether the inductor has reached the second threshold by performing a comparison based on the second differential comparison voltage.

12. The device of claim 1, wherein the synchronous switch includes a first finger and a second finger.

13. The device of claim 12, wherein the synchronous regulator controller further includes a second voltage divider that is coupled to second finger of the synchronous switch, and wherein the second voltage divider include a fourth resistive device and a fifth resistive device, and wherein the comparison circuit further includes a sixth resistive device that is coupled to the second voltage divider and the comparator.

14. A method, comprising:
   driving a synchronous switch to receive an inductor current;
   using a voltage divider that is arranged in parallel with the synchronous switch to sense a portion of the inductor current, wherein the voltage divider includes a first resistive device and a second resistive device that is coupled to the first resistive device;
   using a third resistive device to provide a differential comparison voltage by offsetting a voltage across the second resistive device;
   determining whether the inductor current has reached a threshold by performing a comparison based on the differential comparison voltage; and
   providing a current to the third resistive device such that the offset of the voltage across the second resistive device corresponds to the threshold.

15. The method of claim 14, further comprising:
   biasing the first resistive device in an ohmic region when the synchronous switch is on; and
   biasing a second resistive device in the ohmic region when the synchronous switch is on.

16. The method of claim 14, further comprising:
   outputting a comparator output signal based on the comparison;
   turning the synchronous switch on and off in accordance with pulse modulation control; and
   turning the synchronous switch off when the comparator output signal is asserted.

17. The method of claim 16, wherein performing the comparison is accomplished such that the comparator output signal is asserted when a zero-crossing detection event occurs.

18. The method of claim 16, wherein performing the comparison is accomplished such that the comparator output signal is asserted when an overload event occurs.

19. A device, comprising:
   means for driving a synchronous switch that is arranged to receive an inductor current;
   means for using a voltage divider that is arranged in parallel with the synchronous switch to sense a portion of the inductor current, wherein the voltage divider includes a first resistive device and a second resistive device that is coupled to the first resistive device;
   means for using a third resistive device to provide a differential comparison voltage by offsetting a voltage across the second resistive device;
   means for determining whether the inductor current has reached a threshold by performing a comparison based on the differential comparison voltage; and
   means for providing a current to the third resistive device such that the offset of the voltage across the second resistive device corresponds to the threshold.

20. The device of claim 19, further comprising:
   means for outputting a comparator output signal based on the comparison;
   means for turning the synchronous switch on and off in accordance with modulation control; and
   means for turning the synchronous switch off when the comparator output signal is asserted.

* * * * *